(No Model.)
H. Z. COLES.
COMBINED DROPPER AND CHECK ROW ATTACHMENT.
No. 271,793. Patented Feb. 6, 1883.
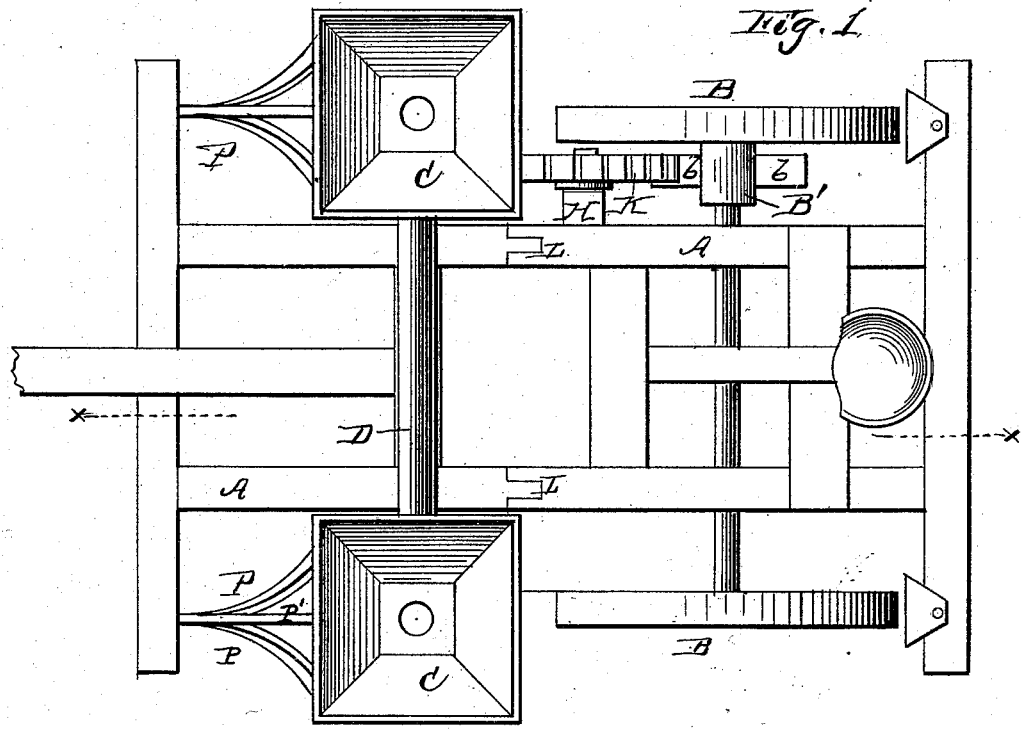
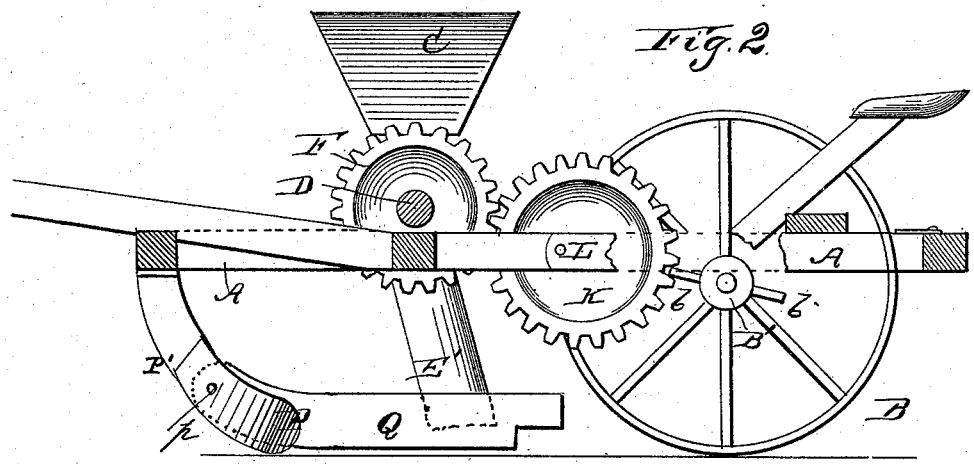
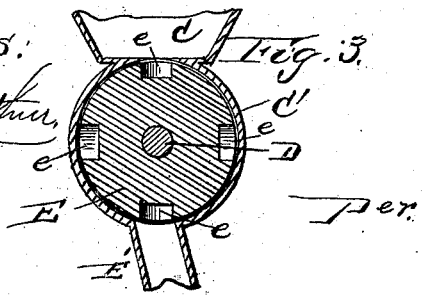
Witnesses:
H. C. McArthur
John C. Rogers
Inventor:
H. Z. Coles
per J. M. Alexander
Attorney

UNITED STATES PATENT OFFICE.

HERBERT Z. COLES, OF LAKE CITY, MINNESOTA.

COMBINED DROPPER AND CHECK-ROW ATTACHMENT.

SPECIFICATION forming part of Letters Patent No. 271,793, dated February 6, 1883.

Application filed June 29, 1882. (No model.)

*To all whom it may concern:*

Be it known that I, HERBERT Z. COLES, of Lake City, in the county of Wabasha and State of Minnesota, have invented certain new and useful Improvements in Combined Dropper and Check-Row Attachment; and I do hereby declare that the following is a full, clear, and exact description thereof, reference being had to the accompanying drawings, and to the letters of reference marked thereon, which form part of this specification.

Figure 1 is a plan view of my combined check-row and seed-dropper. Fig. 2 is a sectional elevation on lines $x\ x$, Fig. 1. Fig. 3 shows the seed-dropping devices in detail.

The object of my invention is to provide simple and effective mechanism for operating the seed-dropping devices of a combined check-row and corn-planter; and it relates also to improvements in the construction and arrangement of the parts thereof, as will be hereinafter fully described.

In the drawings, A is the frame.

B B are the transporting-wheels, one of which is provided with the inwardly-extending hub, B'; and C are the seed-hoppers, which are located at the forward end of the said frame and placed the width of one row apart.

D is an iron shaft extending across the machine and into the circular boxes C', which extend below the hoppers and contain the seed-wheels E, which are rigidly attached to the shaft D, and rotate within the said boxes. The gear-wheel F is secured to the shaft D just outside of one of the boxes C. The stud H, being suitably secured to the frame, carries the gear-wheel K, which rotates thereon and meshes with the wheel F.

To the inwardly-extending hub B' are secured the two oppositely-placed wings $b\ b$, which engage the teeth of wheel K, and, by the revolution of the transporting-wheels with the onward movement of the machine across the field, rotate the wheels K F, shaft D, and seed-wheel E to a predetermined extent at each revolution. By varying the size of the connecting-wheels, or by adding two, one, or more, wings, $b$, the distance between the hills of seed dropped may be increased or diminished to any desired extent.

In order to avoid, as far as possible, injury to the parts by twisting and straining on uneven ground, and to promote lightness of draft, I construct the frame in two parts and provide the flexible joint or hinge L, which is located on a line passing across the machine, near the axis of wheel K, and will allow the frame to yield to very great unevenness of surface without disturbing the operation of the gear-wheels.

The seed-wheels E, secured to the shaft D and rotating in the boxes C, may be of any suitable material, and fit loosely but snugly in the said boxes, so as to prevent any seed from escaping, except by their rotation; and they are provided with the perforations or cups $e$ in their peripheries, which are of a suitable size to contain from three to five grains of corn, and are arranged to coincide alternately with a receiving-hole in the bottom of the hopper and with the discharge-spout E'. I prefer to so proportion the size of all the wheels that the seed-wheels will be rotated by the transporting-wheels.

To the forward end of the frame, on a line with the seed-wheels and the transporting-wheels, are the furrow-openers P' and wings P, which are hinged at $p$ to backwardly-diverging openers Q, between the wings of which the seed-spout E' passes freely. The furrows, after having the seed deposited therein, are closed by the transportation-wheels B B. The wings $b\ b$ should be made in one piece and detachably secured to the hub, so that in traveling no seed need be wasted; or the wheel K may be removed to effect the same result.

With the above-mentioned construction the seed-wheels are rotated to a predetermined extent at each revolution of the transporting-wheels, and by adjusting the machine at the ends of the rows the hills will be in line either way, and the field thus planted in check-row without the use of wire rope or any supplemental machinery.

It is obvious that the position of the parts may be varied without departing from the spirit of my invention.

It will be seen from what I have above stated that I produce a check-row planter by reason of having tappets $b\ b$, which will at given times give rotation to the wheel K, which will operate on the shaft D to discharge the seed through the tube E'. This tube is located between the pivoted blades Q of an opener, P', on each side of which are wings P P. The said blades Q are pivoted to the opener P', as shown and described, and the tubes E' are arranged between the said blades, and the latter are guided thereby.

Having thus described my invention, what I claim, and desire to secure by Letters Patent, is—

The combination in a check-row corn-planter, of a sectional articulating frame, the joints of which are concentric to the axis of the rotary seed-dropping drums, hopper-boxes inclosing these drums, the rotating shaft to which the drums are keyed, having its bearings on the front articulating section of the main frame, the spur-wheel on the said shaft, the spur-intergearing wheel on the rear jointed section of the main frame, the check-row tappets $b\,b$ on the hub of one of the transporting-wheels, adjustable, as described, and drill-openers, all constructed and adapted to operate in unison, substantially in the manner and for the purposes described.

In testimony that I claim the foregoing as my own I affix my signature in presence of two witnesses.

HERBERT Z. COLES.

Witnesses:
 GEO. H. HUTCHINS,
 ABBOT E. SMITH.